UNITED STATES PATENT OFFICE.

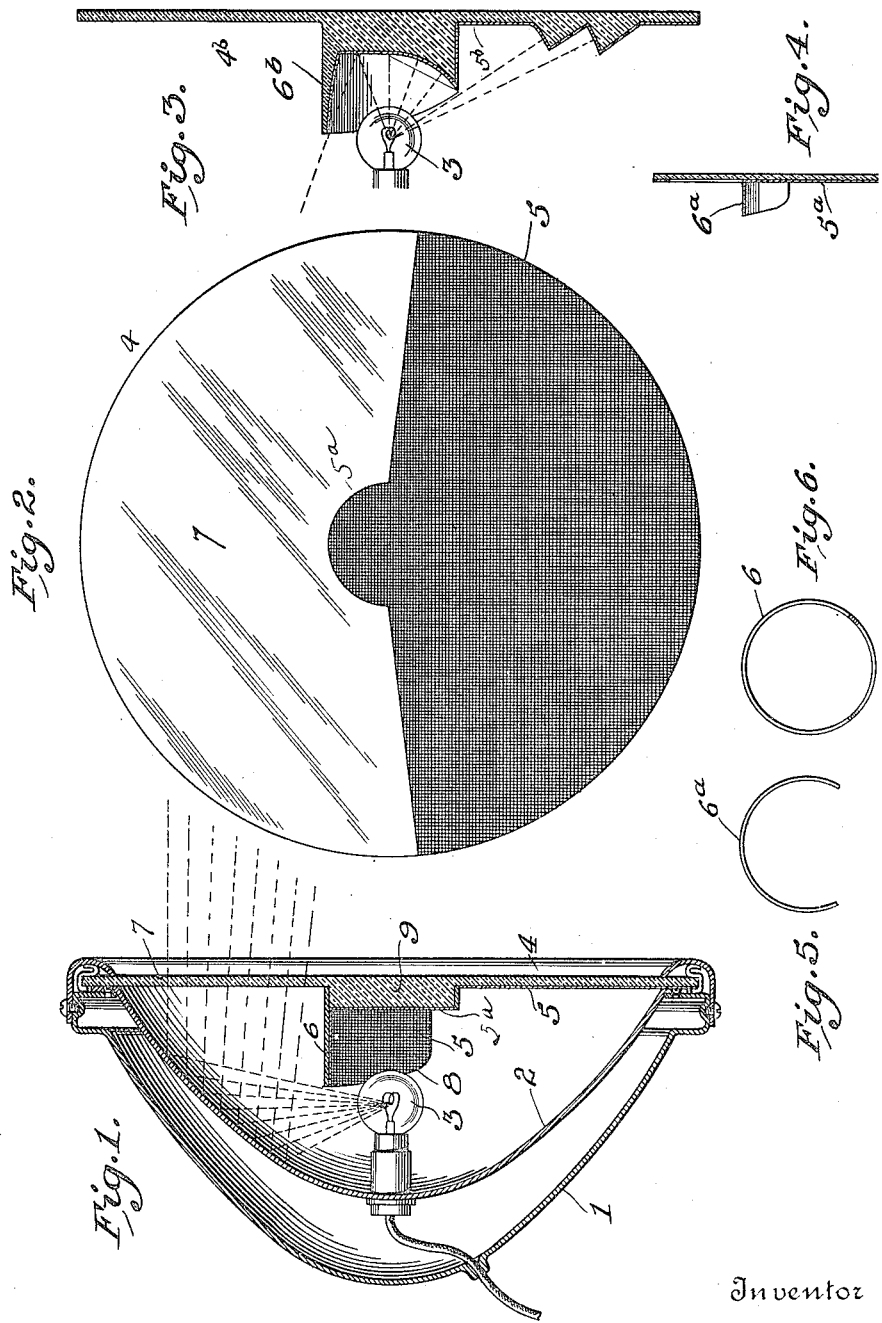

LEON G. WRIGHT, OF PRESTON, MARYLAND, ASSIGNOR OF ONE-HALF TO ERNEST N. WRIGHT, OF CHOPTANK, MARYLAND.

VEHICLE-HEADLIGHT.

1,398,823.  Specification of Letters Patent.  Patented Nov. 29, 1921.

Application filed June 29, 1920. Serial No. 392,707.

*To all whom it may concern:*

Be it known that I, LEON G. WRIGHT, a citizen of the United States, residing at Preston, in the county of Caroline and State of Maryland, have invented certain new and useful Improvements in Vehicle-Headlights; and I do hereby declare the following to be a full, clear, and exact description of the invention such as will enable others skilled in the art to which it appertains to make and use the same.

This invention relates to lanterns for projecting shafts or beams of light, and more specifically to lanterns of this type used as vehicle headlights.

The usual vehicle headlight lantern consists of a casing having a light emitting opening, a paraboloidal reflector located within the casing and so disposed as to reflect the rays of light, radiating from a lamp or source of light located substantially at the focus of the paraboloidal reflector, in a shaft or beam to some distance ahead of the vehicle. In the usual headlight lantern the shaft or beam of light projected ahead of the vehicle is of such cross section at a distance of seventy five feet, or more, that the glare has a blinding effect upon the vision of a person approaching. Furthermore, direct radiations from the lamp or source of light pass obliquely through the light emitting opening of the lantern in such directions that the driver of a vehicle seeking to pass another may have his vision so affected by the light thus emitted from the lamp that he is unable to discern with accuracy the position of the near wheels of his vehicle with respect to the approaching vehicle.

It is well known that most states and municipalities have made laws or ordinance regulating the character of headlights carried by vehicles and requiring those lights to be so constructed as to afford adequate illumination for the driver of the vehicle without permitting the glare therefrom to interfere with the vision of persons approaching.

It is an object of my invention to so modify the light emitted from the light source of a vehicle headlight lantern, having a paraboloidal reflector, that the roadway and space in front of a vehicle will be adequately illuminated without throwing blinding rays into the eyes of a driver of an approaching vehicle, or into the eyes of a pedestrian, and to intercept the rays emitted from the source of light that would otherwise radiate directly out through the light emitting opening of the lantern.

I have accomplished the said object by the means described hereinafter and illustrated in the accompanying drawings.

In said drawings:

Figure 1 is a vertical section through a vehicle headlight lantern;

Fig. 2 is a front elevation of the lens;

Fig. 3 is a modified form of lens;

Fig. 4 illustrates a second modification;

Figs. 5 and 6 illustrate forms of light intercepting hoods as viewed in rear elevation when in position in the lantern.

Similar reference characters designate corresponding parts throughout the several views.

An ordinary vehicle headlight casing is indicated at 1, having, properly disposed with respect thereto, a paraboloidal reflector 2, and a light source 3, illustrated as an incandescent electric lamp, disposed at the focus of the reflector.

The so called lens, covering the light emitting opening of the lantern is indicated at 4. The lower portion of the lens may be rendered opaque, or light obscuring, as by a coating 5 applied to the inner side of the glass of the lens, or by roughening the glass, or providing a ray filter to obstruct the blinding rays, or by any other suitable means. The coating 5, or other light obscuring area, is extended at 5ª in semicircular form and in a position directly in front of the lamp or light source. A hood 6 projects rearward from the central portion of the lens, as shown. The upper portion of the lens is transparent, as indicated at 7.

Paraboloidal reflectors, as usually made and used in vehicle headlights, do not project a shaft or beam of light composed of exactly parallel rays. The radiations from the source of light which strike the perimeter or outer edge of the reflector of the usual vehicle headlight near the edge of the opening, diverge somewhat from the axis, while some of those reflected from portions nearer the center are parallel and others converge. Thus some of the rays illuminate the road near the vehicle. The rays from the upper edge of the reflector, in the usual lantern, are projected so that they may enter the eyes of a pedestrian facing the front of the vehicle or the eyes of a driver of an approaching vehicle at a distance of seventy five feet or more. The opaque or obscuring hood 6, in my invention, is therefore constructed and positioned with respect to the light source so that it will intercept all rays from the light source which would otherwise impinge upon the perimeter of substantially the upper quadrant of the reflector so as to project the rays into the eyes of the approaching driver or pedestrian. The hood 6 has its side edges curved inward and downward, as shown at 8, and so disposed that the lateral rays from the light source 3 will strike farther forward on the reflector than the rays projecting upward from said light source. As a result of the said construction of the hood, the light source, such as the incandescent filament illustrated in the drawings, cannot be seen through the transparent portion 7, of the lens; nor can the radiations which project upward from the light source strike the most forward portions of the reflector; therefore the upper rays of the beam will not be elevated so far as to enter the eyes of an approcahing individual, say at a distance of seventy five feet from the lantern, while the rays projected laterally from the light source will strike farther forward on the reflector and these rays will be so spread as to illuminate a considerable width of the roadway.

By the construction described adequate illumination of the roadway and space in advance of the vehicle may be had without throwing a blinding glare into the eyes of an aproaching driver or pedestrian. Also, by screening all direct rays from the light source so that none will be radiated through the transparent portion of the lens, no blinding light will enter the eyes of the driver of a vehicle directly from the light source when the vehicles are in the position where they are about to pass each other.

The interior of the hood may be coated with a flat, black, light-absorbing pigment and the lower portion of the lens may be coated with a similar pigment, if desired, or the light may be obscured by frosting or roughening the glass or providing a color screen that will eliminate the blinding rays.

In Fig. 1 I have shown a glass lens having a central boss 9 cast therewith and I have shown the hood 6 having a circular band seated on the boss 9.

In Fig. 4 I have shown a screen 5ª composed of a thin sheet of opaque metal which is secured to the lantern on the inner side of the lens and in substantial contact with it, the hood 6ª being soldered or otherwise secured to or formed on the screen 5ª. The hood shown at 6ª is open at the lower part, as indicated in Fig. 5, although it may, if desired, be made circular as indicated in Fig. 6, the essential structure being, as indicated in Fig. 1, that is, the rear edge of the hood should be so contoured as to permit the lateral rays from the lamp 3 to impinge against the forward zone of the paraboloidal reflector 2 while the upper portion of said hood cuts off those rays that would otherwise impinge upon the forward zone of the reflector.

Instead of making the screen opaque, (either light obsorbing or totally light reflecting) the screen may be produced by frosting the glass, by grinding it, or by roughening it in such manner that such rays as are transmitted will be deflected and broken so that no direct rays may be transmitted and such light as does pass through the screened portion will be softened and cause no glare.

Instead of having the screen and hood coated with a light-absorbing coating, or roughened, or provided with a colored filtering medium, whereby the power of the projector is considerably reduced, reflecting surfaces may be formed on the screen and hood so designed as to throw back part of the light received thereon substantially past the focal point of the reflector as diagrammatically indicated in Fig. 3, so that the direct rays striking the opaque portion may be reflected out through the transparent portion of the lens and thereby increase the illuminating power of the lantern over what it would be were said opaque portions coated with a light-absorbing material.

In the form shown in Fig. 3, the lens 4ᵇ, hood 6ᵇ and screen are cast in one piece of glass and the opaque or light obscuring portions produced by silvering.

In said form of the invention ridges having surfaces substantially tangential or perpendicular with respect to rays emanating from the center of the light source 3 may be utilized so as to reflect said rays approximately to points on the upper half of the paraboloidal reflector from which they will be projected forward through the transparent portion of the lens.

In using terms of direction, such as upper, lower, lateral or side, with respect to the so called lens, screen and hood, reference is intended to directions and positions when the lantern is in position on the vehicle.

A lens having associated therewith a screen and hood made according to this invention is intended to be applicable to any of the standard headlights, it being understood that the hood may vary somewhat in proportions for lanterns of different manufacture without departing from the principle of the invention.

Having described my invention in such manner as to enable persons skilled in the art to make and use the same, what I claim and desire to secure by Letters Patent is:

1. As an article of manufacture, a lens for a vehicle headlight lantern having its lower half screened and its upper half transparent, a center hood projecting rearward, said hood having its rear side edges convexly curved downward and forward.

2. As an article of manufacture, a vehicle headlight lantern having a paraboloidal reflector, a substantially opaque screen below the horizontal diameter of the light emitting opening of said reflector, an opaque hood constructed and arranged to intercept all direct rays from the light source that otherwise would radiate through said light emitting opening, said hood permitting substantially all other direct rays to impinge upon the paraboloidal reflector, said opaque screen having reflecting surfaces adapted to reflect impinging rays from the light source directly backward substantially through the focus of the paraboloidal reflector.

In testimony whereof I affix my signature.

LEON G. WRIGHT.